US007171736B1

(12) United States Patent
Kennon

(10) Patent No.: US 7,171,736 B1
(45) Date of Patent: Feb. 6, 2007

(54) PORTABLE FIRE EXTINGUISHER STAND SYSTEM

(76) Inventor: Add Kennon, 6 Sandy Beach, Vallejo, CA (US) 94590

( * ) Notice: Subject to any disclaimer, the term of this patent is extended or adjusted under 35 U.S.C. 154(b) by 0 days.

(21) Appl. No.: 10/716,217

(22) Filed: Nov. 18, 2003

(51) Int. Cl.
*B23P 19/00* (2006.01)
*A62C 25/00* (2006.01)

(52) U.S. Cl. ......................... 29/426.1; 29/428; 29/525; 169/51

(58) Field of Classification Search ............... 29/426.1, 29/428, 525; 248/146, 150, 151, 158, 176.1, 248/177.1, 188.5, 309, 312, 309.1; 211/71.01, 211/74, 85, 118, 189
See application file for complete search history.

(56) References Cited

U.S. PATENT DOCUMENTS

| | | | | | |
|---|---|---|---|---|---|
| 1,647,039 | A | * | 10/1927 | Fischer | 248/309 |
| 2,615,238 | A | | 10/1952 | Highwood | 29/288 |
| 2,625,308 | A | * | 1/1953 | Green | 294/143 |
| 2,936,144 | A | * | 5/1960 | Otis | 248/150 |
| 3,035,660 | A | * | 5/1962 | Leon | 182/186.5 |
| 3,180,288 | A | * | 4/1965 | McCowan | 108/101 |
| 3,239,010 | A | * | 3/1966 | Huthsing, Jr. | 169/51 |
| 3,368,783 | A | * | 2/1968 | Deutsch | 248/176.1 |
| 3,565,384 | A | * | 2/1971 | Lockwood | 248/312 |
| 3,662,980 | A | * | 5/1972 | Kantor et al. | 248/161 |
| 3,702,157 | A | * | 11/1972 | Thomas | 169/51 |
| 3,942,669 | A | | 3/1976 | Savage, Jr. | 220/18 |
| 3,990,601 | A | * | 11/1976 | Joyce | 220/500 |
| 4,026,220 | A | * | 5/1977 | Schuring, Jr. | 108/101 |
| 4,105,176 | A | * | 8/1978 | Hill et al. | 248/676 |
| D250,377 | S | | 11/1978 | Dooley et al. | D6/127 |
| 4,303,218 | A | | 12/1981 | Naegeli | 248/146 |
| 4,338,866 | A | * | 7/1982 | Streit | 108/191 |
| 4,345,526 | A | * | 8/1982 | Streit | 108/191 |
| 4,486,044 | A | | 12/1984 | Gordon et al. | 294/31.2 |
| 4,830,318 | A | * | 5/1989 | O'Brien | 248/165 |
| 4,890,693 | A | * | 1/1990 | O'Brien | 182/151 |
| 5,074,506 | A | * | 12/1991 | Larsen | 248/309.1 |
| 5,275,571 | A | * | 1/1994 | Musto et al. | 434/226 |
| 5,305,850 | A | * | 4/1994 | McQuiston | 182/153 |
| 5,720,456 | A | * | 2/1998 | Szybura | 248/126 |
| 5,775,650 | A | * | 7/1998 | Fox | 248/176.1 |
| 5,924,659 | A | * | 7/1999 | Babcock | 248/146 |
| 5,975,470 | A | | 11/1999 | Casey | 248/146 |
| 5,975,475 | A | * | 11/1999 | Chaplin | 248/311.2 |

(Continued)

FOREIGN PATENT DOCUMENTS

GB 2029197 A * 3/1980

*Primary Examiner*—Essama Omgba
(74) *Attorney, Agent, or Firm*—Goldstein Law Offices P.C.

(57) ABSTRACT

A method of assembling and storing a portable stand for a fire extinguisher having a case, a pylon and a base. The case has a rear wall and a bottom wall. The pylon has a front surface, an open bottom with an outer flange and a top that is narrower than the outer flange. In addition, the base is generally rectangular and has a central opening in its upper and lower surfaces. The assembly method involves inserting the top of the pylon upwardly through the central opening until the outer flange engages the base, mounting the case onto the front surface of the pylon and positioning the fire extinguisher inside the case such that it rests on the bottom wall. The storage method comprises detaching the case from the pylon of each stand, separating the pylon and the base of each stand, stacking the pylons and stacking the bases.

4 Claims, 4 Drawing Sheets

U.S. PATENT DOCUMENTS

| | | | | |
|---|---|---|---|---|
| 6,450,463 | B1 | 9/2002 | McCord et al. | 248/146 |
| 6,715,445 | B2 * | 4/2004 | Plante et al. | 119/461 |
| 6,902,074 | B2 * | 6/2005 | Albrecht | 211/189 |
| 6,923,143 | B2 * | 8/2005 | Plante et al. | 119/462 |
| 2004/0035990 | A1 * | 2/2004 | Ackeret | 248/176.1 |
| 2005/0133675 | A1 * | 6/2005 | Marshall | 248/159 |
| 2005/0183867 | A1 * | 8/2005 | Gaskill | 169/30 |

* cited by examiner

PORTABLE FIRE EXTINGUISHER STAND SYSTEM

BACKGROUND OF THE INVENTION

1. Field of the Invention

The invention generally relates to a portable stand for a fire extinguisher, and in particular it relates to methods of assembling and storing such a stand.

2. Description of the Related Art

Workers at construction sites may encounter a plethora of occupational hazards while performing their responsibilities. As an initial matter, any piece of heavy-duty equipment routinely used by construction workers, including bulldozers, cranes, jackhammers and the like, can malfunction and inflict lethal injuries. Even if all of the machines being used function properly, debris such as loose chunks of concrete, flying pebbles and particle-laden air in the immediate environment pose serious health risks. In addition, road crews that work on heavily traveled thoroughfares such as interstate and state highways must face passing high-speed vehicular traffic. Speeding automobiles, truck and motorcycles operated by seemingly blithe drivers routinely pass within a few feet, or less, of construction workers.

Numerous other dangers confront construction workers as well. One of the most serious of these is fire. However, at the present time, construction crews have limited options in preparing for and handling fires on their work sites. Without fire protection equipment of some type, the most common of which is the inexpensive hand-held fire extinguisher, workers have virtually no capacity to quell raging flames in an emergency. The currently available stands for fire extinguishers are bulky, heavy and difficult to transport between locations. Furthermore, much floor space is usually required in order to store these stands. Hence, there is a pressing need for a portable fire extinguisher stand that can be easily assembled, effectively utilized at a construction work site, easily disassembled and compactly stored.

U.S. Patent No. Des. 250,377 to Dooley et al. ("Dooley") teaches an ornamental design for a fire extinguisher housing. However, a fire extinguisher housing having the design of Dooley would be impractical for use at a construction work site since a worker could easily tip it over.

U.S. Pat. No. 2,615,238 to Highwood ("Highwood") discloses a tank clamp support holder. However, the holder of Highwood cannot be easily disassembled.

U.S. Pat. No. 3,942,669 to Savage ("Savage") teaches a fire extinguisher support and enclosure structure. However, the structure of Savage is impractical for use at a construction work site since a worker could easily tip it over.

U.S. Pat. No. 4,303,218 to Naegeli ("Naegeli") discloses a portable fire extinguisher support. However, the support of Naegeli cannot be compactly stored due to its configuration.

U.S. Pat. No. 4,486,044 to Gordon et al. ("Gordon") teaches an apparatus for supporting and transporting a gas cylinder. However, the apparatus of Gordon is impractical for use at a construction work site since a worker could easily tip it over.

U.S. Pat. No. 5,975,470 to Casey ("Casey") discloses a medical vial holding device. However, the device of Casey is impractical for use at a construction work site since a worker could easily tip it over.

U.S. Pat. No. 6,450,463 B1 to Mc Cord ("Mc Cord") teaches a support and positioning structure for gas cylinders. However, the structure of Mc Cord cannot be compactly stored due to its configuration.

While these devices may be suitable for the particular purposes employed, or for general use, they would not be as suitable for the purposes of the present invention as disclosed hereafter.

SUMMARY OF THE INVENTION

It is an object of the invention to provide a stand for a fire extinguisher that is portable. Accordingly, the stand is compact and lightweight and contains a handle so that it can be readily transported to any location.

It is another object of the invention to provide a stand for a fire extinguisher that can be effectively utilized at a construction work site. Accordingly, the stand has a wide base that solidly supports a vertically extending pylon and an attached case.

It is a further object of the invention to provide a stand for a fire extinguisher that can be easily assembled and disassembled. Accordingly, the case mounts onto the pylon with two screws and the pylon readily engages the base.

It is a further object of the invention to provide a stand for a fire extinguisher with components that can be compactly stored. Accordingly, a user can safely stack the pylons and the bases of many stands on top of each other in a relatively small floor area.

The invention includes methods of assembling and storing a portable stand for a fire extinguisher having a case, a pylon and a base. The case has a rear wall and a bottom wall. The pylon has a front surface, an open bottom with an outer flange and a top that is narrower than the outer flange. In addition, the base is generally rectangular and has a central opening in its upper and lower surfaces. The assembly method involves inserting the top of the pylon upwardly through the central opening until the outer flange engages the base, mounting the case onto the front surface of the pylon and positioning the fire extinguisher inside the case such that it rests on the bottom wall. The storage method comprises detaching the case from the pylon of each stand, separating the pylon and the base of each stand, stacking the pylons and stacking the bases.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
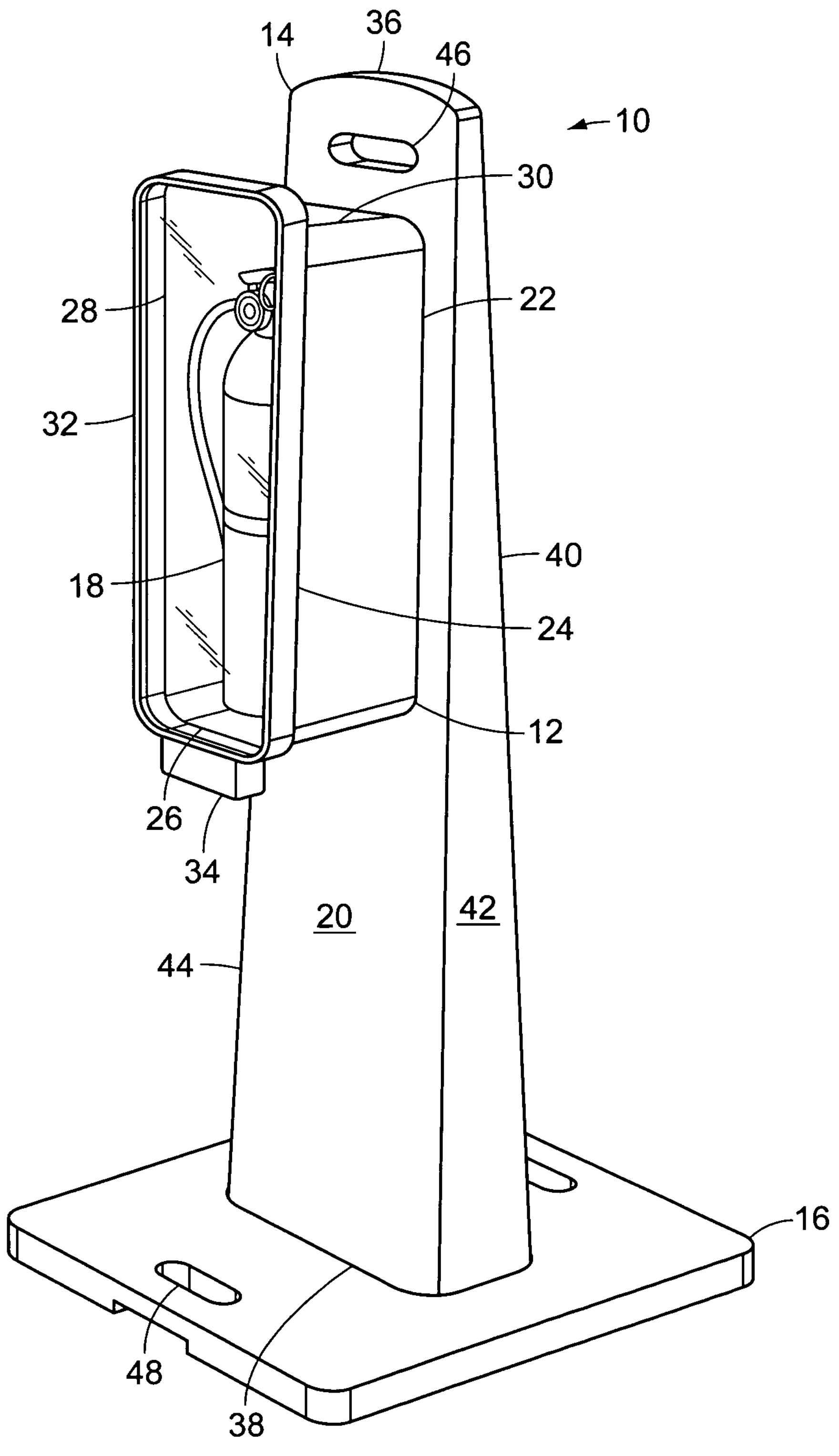
FIG. 1 is a diagrammatic perspective view of the stand for a fire extinguisher according to the present invention.

FIG. 1 illustrates the stand 10 for a fire extinguisher according to the present invention. The stand 10 has a case 12, a pylon 14 and a base 16. The case 12, which has a rectangular cross-section, is squarely and firmly mounted onto a front surface 20 of the pylon 14. The case 12 has a left wall 28, a right wall 24, a rear wall 22, a top wall 30 and a bottom wall 26. The left wall 28 and right wall 24 are both substantially orthogonal to the top wall 30 and the bottom wall 26. In addition, the left wall 28 and the right wall 24 are normal to the front surface 20. The case 12 contains a traditional hand-held fire extinguisher 18, which may rest on its bottom wall 26 or may be secured to its rear wall 22. Optionally, a transparent front cover 32, which is longer than the left wall 28 or the right wall 24 and is wider than the top wall 30 or the bottom wall 26, can be positioned over the front surface of the case 12. The front cover 32 has a generally rectangular configuration and is hingedly fastened to the body of the case 12 along either the left wall 28 or the top wall 30. A horizontal handle 34 extends from the lower edge of the front cover 32 to allow a user access to the interior of the case 12. Any durable non-corrosive material can be used to manufacture the body of the case 12, although wind-resistant plexiglass is preferred for the front cover 32.

The pylon 14 has an irregular shape and vertically projects from the base 16, to which it is secured. Structurally, the pylon 14 has a top 36, an open bottom 38, a front surface 20, a rear surface 40, a left surface 44 and a right surface 42. The pylon 14 is tapered such that the front surface 20, the rear surface 40, the left surface 44 and the right surface 42 together define an increasingly narrow transverse cross section from the bottom 38 to the top 36. In order to facilitate carrying the stand 10, a handle 46 is preferably provided near the top 36. The handle 46 can assume the form of an elongated recess that extends through the front surface 20 and the rear surface 40, as shown. Alternatively, the handle 46 can consist of an external strap firmly attached to the left surface 44 and the right surface 42. The dimensions of the bottom 38 and the height of the pylon 14 both depend upon how close to the top 36 the case 12 is mounted onto the front surface 20. The pylon 14 is specifically designed and constructed in such a manner as to allow it to support the case 12 and maintain its upright position in all but the most extreme weather conditions. The base 16 has a generally rectangular configuration. Two handles 48 can optionally be embedded near opposing edges of the base 16.

Figure 2:
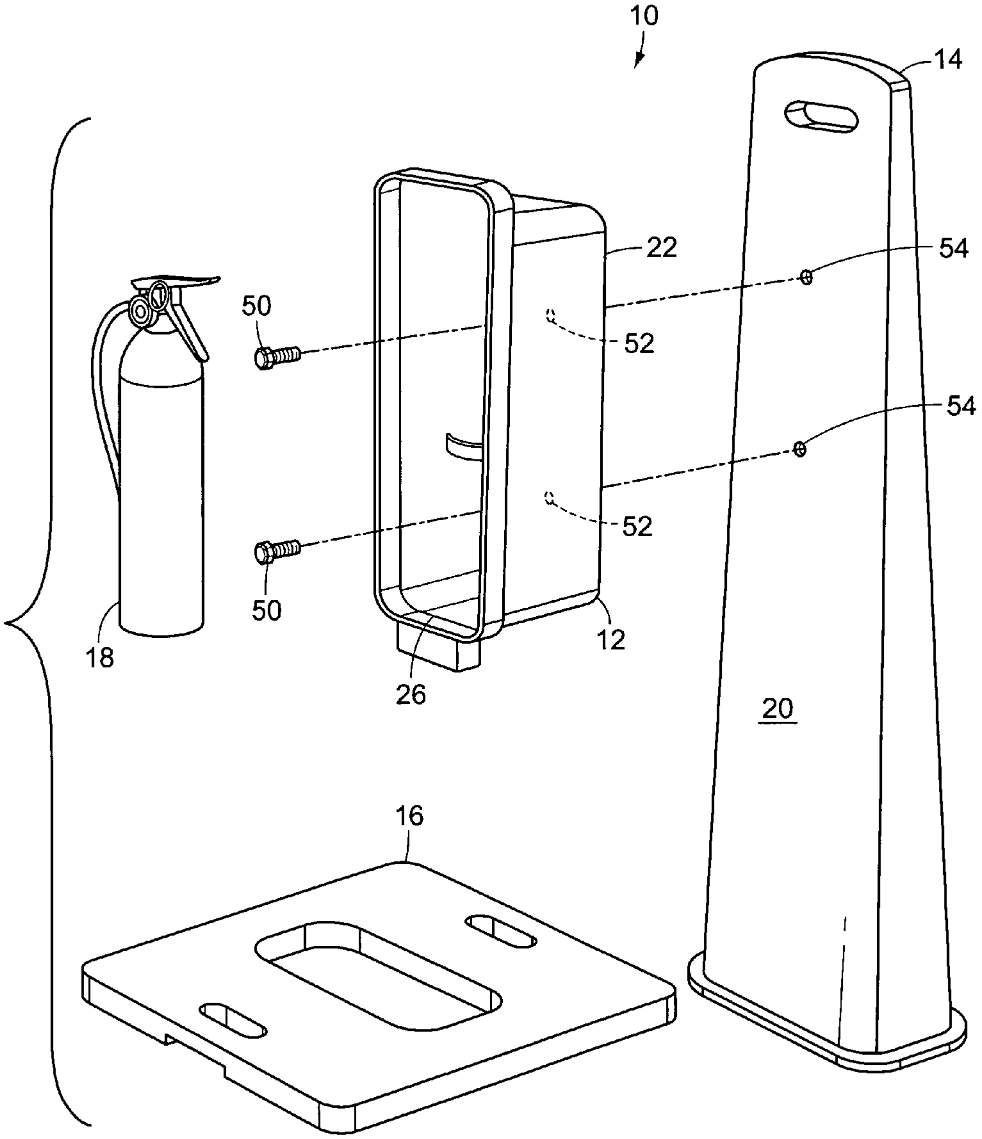
FIG. 2 is a diagrammatic perspective view of the case being mounted onto the pylon by inserting screws in the direction of the phantom lines.

FIG. 2 depicts the case 12 being mounted onto the pylon 14. Two relatively small circular apertures 52, which are represented by dashed lines since they are hidden from view, are vertically aligned along the rear wall 22 of the case 12. In addition, there are two vertically aligned circular holes 54 in the front surface 20 of the pylon 14. In order to attach the case 12 to the pylon 14, a user first vertically aligns the apertures 52 in the rear wall 22 with the apertures 54 in the front surface 20. The user then inserts two screws 50 through both apertures 52 and 54 and turns them with a screwdriver until they lock into place. Other means of securing the case 12 to the pylon 14, such as a velcro-like adhesive or mounting brackets, can also be utilized. After installing the case 12, the user places the fire extinguisher 18 on the bottom wall 26 of the case 12.

Figure 3:
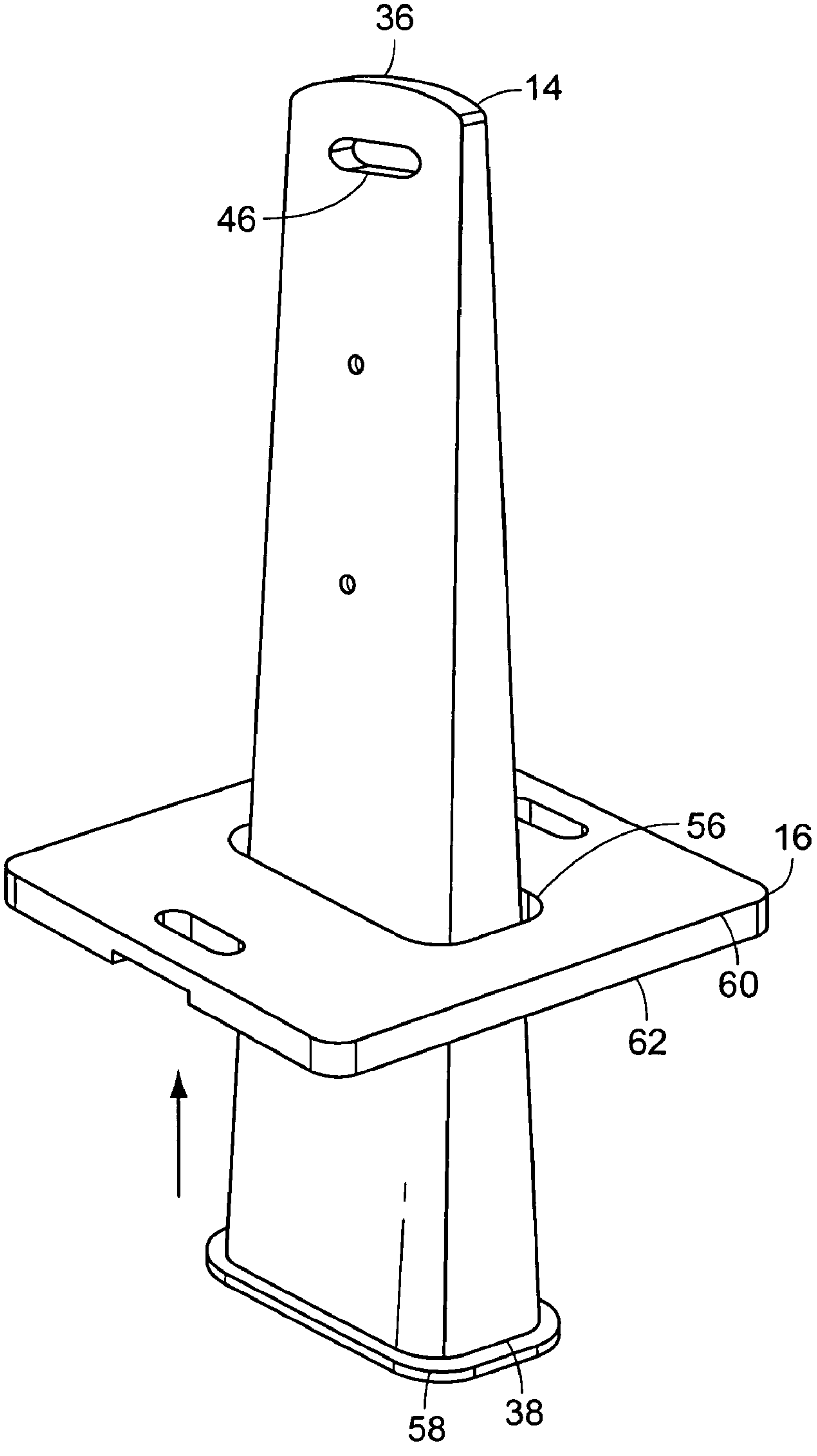
FIG. 3 is a diagrammatic perspective view of the base being attached to the pylon.

FIG. 3 shows the base 16 being attached to the pylon 14. The bottom 38 of the pylon 14 has an outer flange 58 that circumscribes and projects from its perimeter. In addition, the base 16 has a central opening in its upper surface 60 and its lower surface 62. A user inserts the top 36 of the pylon 14 upwardly through the central opening 56 until the outer flange 58 engages the base 16, which occurs when the base 16 reaches the bottom 38. Although the base 16 does not mechanically connect to the pylon 14, it does not move when a user grabs the handle 46 since the outer flange 58 extends against the lower surface 62.

Figure 4:
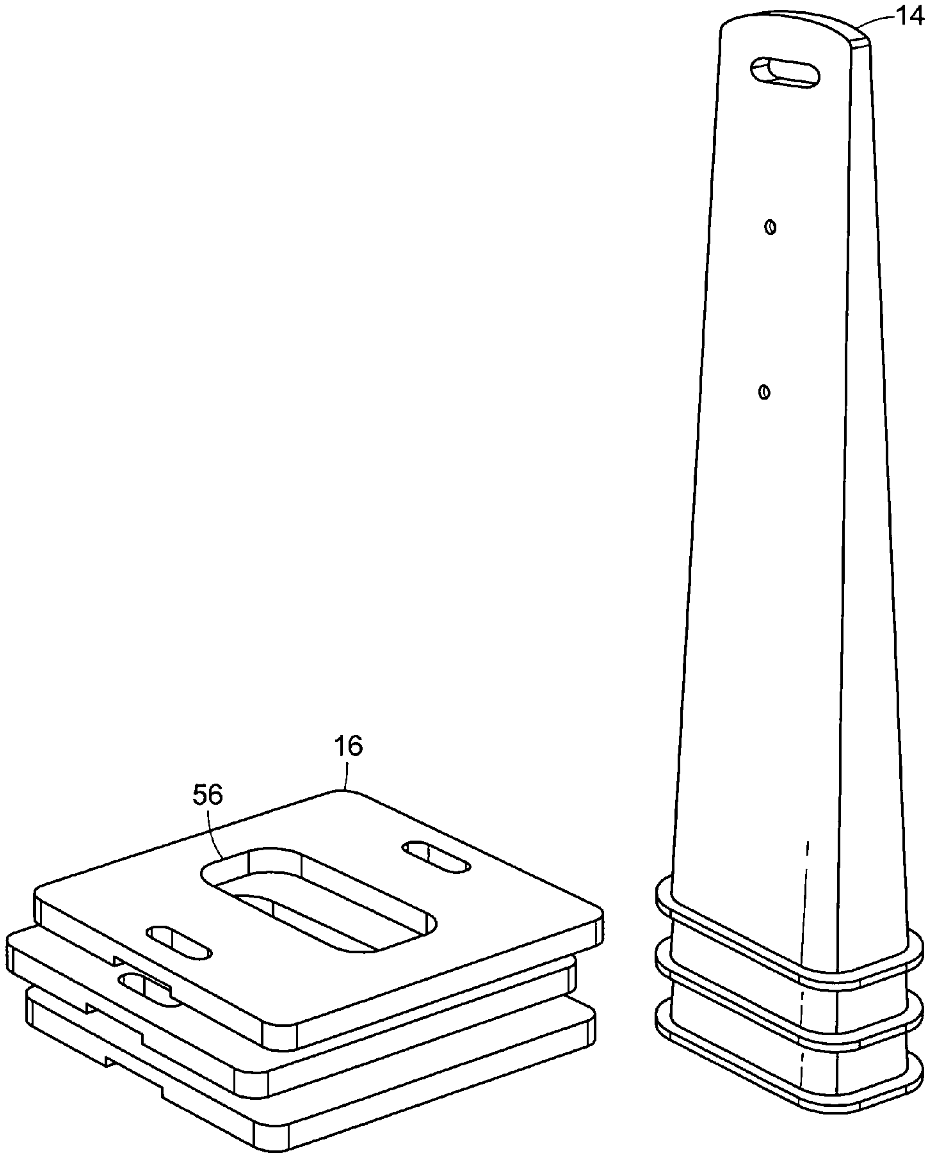
FIG. 4 is a diagrammatic perspective view of three bases stacked on top of each other and three pylons stacked on top of each other.

FIG. 4 illustrates three bases 16 stacked on top of each other and three pylons 14 stacked on top of each other. Numerous bases 16 and pylons 14 can be compactly stored in this manner without falling over. A user stacks the first two bases by a) placing the lower surface of a first base adjacent to a ground surface, b) positioning a second base over the first base such that its central opening is vertically aligned with the central opening of the first base and c) lowering the second base onto the first base. In order to add a third base to the pile, the user a) positions the third base over the second base such that its central opening is vertically aligned with the central opening of the second base and b) lowers the third base onto the second base. The user repeats these steps each time he adds another base to the pile. Similarly, a user stacks the first two pylons by a) standing a first pylon such that its bottom rests on the ground surface, b) positioning a second pylon over the first pylon such that its bottom surrounds the top of the first pylon and c) lowering the second pylon onto the first pylon such that the front surface of the second pylon is adjacent to and nearly co-extensive with the front surface of the first pylon. In order to add a third pylon to the pile, the user a) positions a third pylon over the second pylon such that its bottom surrounds the top of the second pylon and b) lowers the third pylon onto the second pylon such that the front surface of the third pylon is adjacent to and nearly co-extensive with the front surface of the second pylon. The user repeats these steps each time he adds another pylon to the pile.

In conclusion, herein is presented a portable stand for a fire extinguisher. The invention is illustrated by example in the drawing figures, and throughout the written description. It should be understood that numerous variations are possible, while adhering to the inventive concept. Such variations are contemplated as being a part of the present invention.

What is claimed is:

1. A method of using a portable stand for a fire extinguisher that has components including a case for holding the fire extinguisher, a pylon, and a base having a central opening, the method comprising the steps of:

assembling the stand by i) attaching the pylon to the base, ii) attaching the case to the pylon, and iii) placing the fire extinguisher inside the case;

displaying the stand at a work site;

disassembling the stand; and storing the components.

2. The method of using a portable stand for a fire extinguisher as recited in claim 1, wherein the step of attaching the pylon to the base comprises inserting the top of the pylon upwardly through the central opening of the base.

3. The method of using a portable stand for a fire extinguisher as recited in claim 2, wherein the step of disassembling the stand comprises the steps of:

removing the fire extinguisher from the case;

detaching the case from the pylon; and separating the base from the pylon.

4. The method of using a portable stand for a fire extinguisher as recited in claim 3, wherein the step of storing the components comprises the steps of:

placing the pylon on top of another pylon of the same type; and placing the base on top of another base of the same type.

* * * * *